(12) United States Patent
Arumi et al.

(10) Patent No.: US 7,929,964 B2
(45) Date of Patent: Apr. 19, 2011

(54) MANAGING MOBILE STATION WI-FI COMMUNICATIONS

(75) Inventors: Gil Arumi, Madrid (ES); Henry Chor, Swindon (GB); Chris Sanders, Calne (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 928 days.

(21) Appl. No.: 11/759,994

(22) Filed: Jun. 8, 2007

(65) Prior Publication Data
US 2008/0305786 A1    Dec. 11, 2008

(51) Int. Cl.
*H04W 4/00* (2009.01)

(52) U.S. Cl. ............ 455/426.1; 455/574; 455/41.2; 455/434; 455/442; 455/67.11; 370/329; 370/338

(58) Field of Classification Search ........... 455/552.1, 455/442, 574, 41.2, 434, 67.11, 561; 370/328, 370/331, 338, 329, 352, 401
See application file for complete search history.

(56) References Cited

U.S. PATENT DOCUMENTS

| | | | | |
|---|---|---|---|---|
| 5,367,558 A * | 11/1994 | Gillig et al. | ........... | 455/426.1 |
| 5,920,815 A * | 7/1999 | Akhavan | ........... | 455/426.1 |
| 7,162,236 B2 * | 1/2007 | Dorenbosch et al. | ........... | 455/432.1 |
| 7,187,923 B2 * | 3/2007 | Mousseau et al. | ........... | 455/416 |
| 7,313,399 B2 * | 12/2007 | Rhee et al. | ........... | 455/445 |
| 7,376,112 B2 * | 5/2008 | Liu | ........... | 370/338 |
| 7,508,781 B2 * | 3/2009 | Liu et al. | ........... | 370/311 |
| 7,693,516 B2 * | 4/2010 | Hundal et al. | ........... | 455/435.1 |
| 7,715,790 B1 * | 5/2010 | Kennedy | ........... | 455/41.2 |
| 7,809,381 B2 * | 10/2010 | Aborn et al. | ........... | 455/456.5 |
| 2003/0134636 A1 * | 7/2003 | Sundar et al. | ........... | 455/432 |
| 2005/0128988 A1 * | 6/2005 | Simpson et al. | ........... | 370/338 |
| 2005/0147049 A1 | 7/2005 | Ganesan | | |
| 2005/0176420 A1 | 8/2005 | Graves et al. | | |
| 2005/0259611 A1 | 11/2005 | Bhagwat et al. | | |
| 2005/0286466 A1 * | 12/2005 | Tagg et al. | ........... | 370/329 |
| 2006/0035632 A1 | 2/2006 | Sorvari et al. | | |
| 2006/0046736 A1 | 3/2006 | Pering et al. | | |
| 2006/0052113 A1 * | 3/2006 | Ophir et al. | ........... | 455/456.1 |
| 2006/0063560 A1 * | 3/2006 | Herle | ........... | 455/552.1 |
| 2006/0116127 A1 * | 6/2006 | Wilhoite et al. | ........... | 455/442 |
| 2006/0227721 A1 | 10/2006 | Hirai et al. | | |

(Continued)

FOREIGN PATENT DOCUMENTS

EP    1480389 A2    11/2004

(Continued)

OTHER PUBLICATIONS

International Preliminary Report on Patentability for International Application No. PCT/US2008/006968 mailed Dec. 23, 2009.

(Continued)

*Primary Examiner* — Sharad Rampuria
(74) *Attorney, Agent, or Firm* — Carlson, Gaskey & Olds, P.C.

(57) ABSTRACT

Managing wireless fidelity communications for a mobile station includes automatically activating and deactivating wireless fidelity communication capability on the mobile station. Whenever wireless fidelity communications are not active, the wireless fidelity capability is turned off until at least one of a plurality of preselected triggering events occurs. If at least one of the triggering events occurs, a wireless fidelity probing mode begins and a wireless fidelity communication connection is established if one is available.

13 Claims, 4 Drawing Sheets

U.S. PATENT DOCUMENTS

| | | | |
|---|---|---|---|
| 2006/0271678 A1 | 11/2006 | Jessup et al. | |
| 2007/0004427 A1 | 1/2007 | Morgan et al. | |
| 2007/0008925 A1* | 1/2007 | Dravida et al. | 370/331 |
| 2007/0026862 A1 | 2/2007 | Hicks et al. | |
| 2007/0042749 A1* | 2/2007 | Ben Ayed | 455/404.2 |
| 2007/0147311 A1* | 6/2007 | Brok | 370/335 |
| 2008/0026742 A1* | 1/2008 | Thomas et al. | 455/425 |
| 2008/0039132 A1* | 2/2008 | Delibie et al. | 455/552.1 |
| 2008/0062919 A1* | 3/2008 | Chen et al. | 370/329 |
| 2008/0062940 A1* | 3/2008 | Othmer et al. | 370/338 |
| 2008/0076419 A1* | 3/2008 | Khetawat et al. | 455/435.1 |
| 2008/0122582 A1* | 5/2008 | Baker et al. | 340/10.5 |
| 2008/0130604 A1* | 6/2008 | Boyd | 370/338 |
| 2008/0139222 A1* | 6/2008 | Falvo et al. | 455/456.3 |
| 2008/0140868 A1* | 6/2008 | Kalayjian et al. | 710/8 |
| 2008/0200166 A1* | 8/2008 | McCamon | 455/426.1 |
| 2008/0259885 A1* | 10/2008 | Faulkner et al. | 370/338 |
| 2008/0303681 A1* | 12/2008 | Herz et al. | 340/671 |
| 2008/0318561 A1* | 12/2008 | Olshansky et al. | 455/417 |
| 2009/0124284 A1* | 5/2009 | Scherzer et al. | 455/552.1 |
| 2009/0137247 A1* | 5/2009 | Mok | 455/434 |
| 2009/0197594 A1* | 8/2009 | Chintada et al. | 455/426.2 |
| 2010/0195632 A1* | 8/2010 | Prabhu | 370/338 |

FOREIGN PATENT DOCUMENTS

| | | |
|---|---|---|
| EP | 1638360 A1 | 3/2006 |
| WO | 2007021986 A2 | 2/2007 |

OTHER PUBLICATIONS

International Search Report and Written Opinion of the International Searching Authority for International application No. PCT/US2008/006968 mailed Dec. 29, 2008.

* cited by examiner

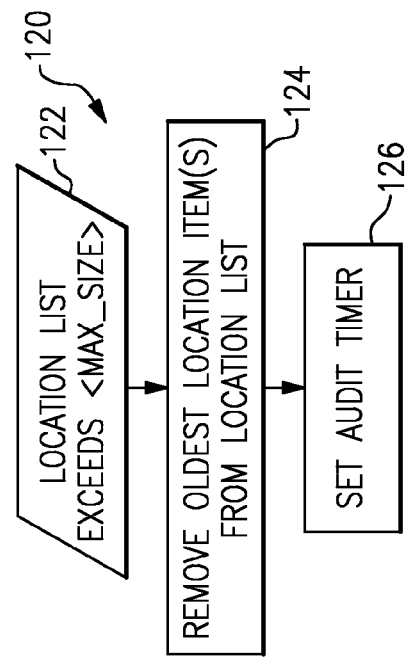
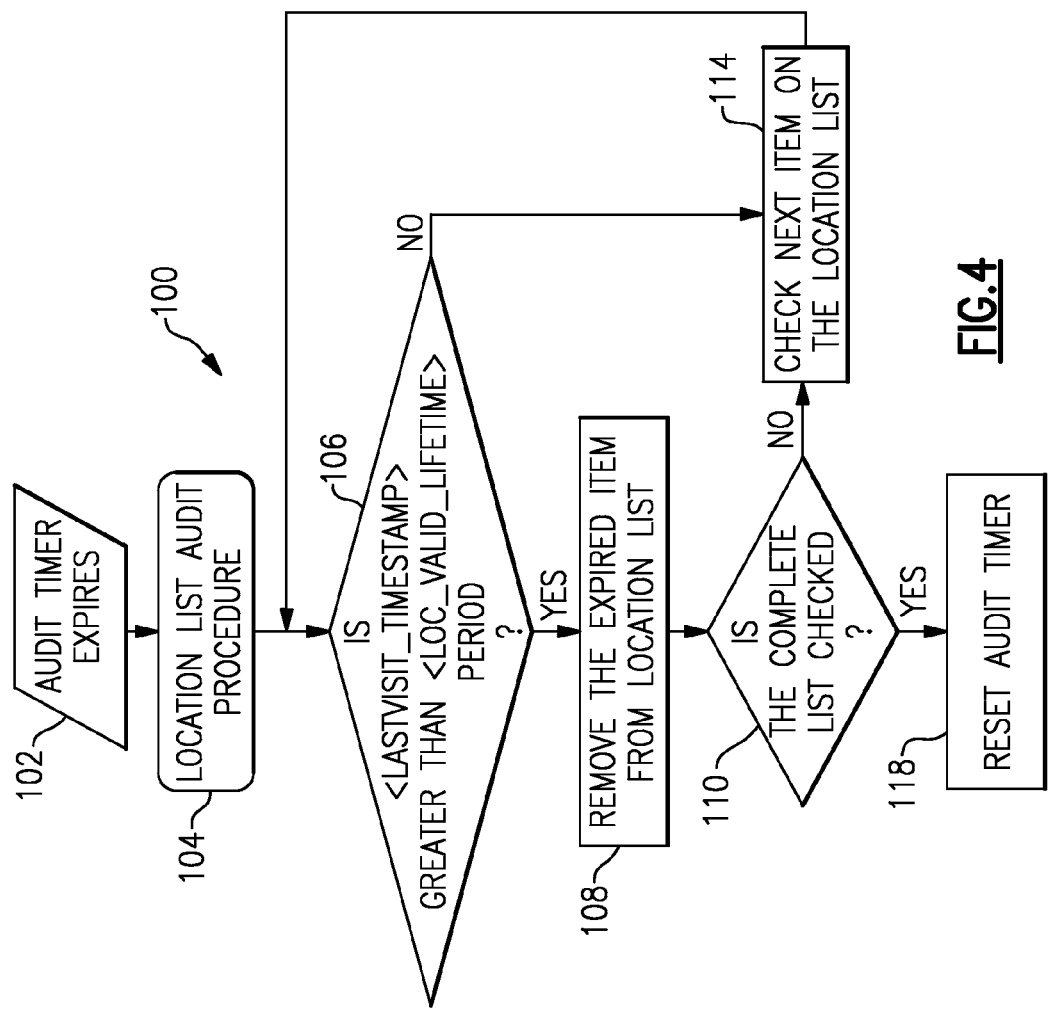
FIG.5
FIG.4

MANAGING MOBILE STATION WI-FI COMMUNICATIONS

FIELD OF THE INVENTION

This invention generally relates to communications. More particularly, this invention relates to wireless communications.

DESCRIPTION OF THE RELATED ART

Wireless communication systems are well known and in widespread use. Cellular communication networks typically include a plurality of base stations geographically located to serve corresponding regions or cells. Mobile stations such as cell phones, personal digital assistants and laptop computers communicate using radio frequency signals through the base stations to a cellular network, which facilitates communications with other devices.

There are other wireless communication technologies that are available such as IEEE 802.11 wireless fidelity (Wi-Fi) communications. Wi-Fi communications typically have higher bandwidth capability than IP connectivity available through cellular networks. Additionally, Wi-Fi communications are typically available at a lower cost. Wi-Fi communication capability, however, is typically limited to within a closer range of a Wi-Fi access point or source of Wi-Fi communications. Typical ranges are from about fifty to several hundred meters. Wi-Fi access points can be located inside of buildings that are privately owned or in public buildings, for example.

Some mobile stations have the capability of communicating using a cellular network, Wi-Fi communications or both. Some known mobile stations have a connection manager that switches between Wi-Fi and cellular-based (e.g., WAN IP connectivity) communications based on the availability of each network and other criteria such as application needs, etc. With such devices, the connection manager software relies upon the Wi-Fi network card of the mobile station to provide an indication whether a Wi-Fi communication network is currently available. Leaving a Wi-Fi network card switched on for this purpose undesirably utilizes battery power because the network card must be switched on even while it is not being used.

In some cases, the user of the mobile station can manually select which technology to access. For example, an individual having such a device may switch on the Wi-Fi capability of the device once the individual arrives at the office where there is a Wi-Fi access point. There is a disadvantage associated with manual activation in that it can be inconvenient for the user. Additionally, the user may inadvertently leave on a Wi-Fi network card, which has the battery draining disadvantage mentioned above.

It would be advantageous to provide automatic management of Wi-Fi capability for a mobile station that does not require manual activation of the Wi-Fi capability and does not require a Wi-Fi network card to be permanently switched on.

SUMMARY

An exemplary method of managing Wi-Fi capability for a mobile station includes turning off a Wi-Fi communications portion of the mobile station when the mobile station is not being used for Wi-Fi communications. The mobile station enters a Wi-Fi probing mode responsive to at least one of a plurality of preselected triggering events to determine whether the Wi-Fi communications capability should remain active.

An exemplary mobile station includes a first portion having a Wi-Fi communications capability. A second portion includes a Wi-Fi communications manager that controls when the first portion is active. The Wi-Fi communications manager turns off the first portion when Wi-Fi communications are not in use. The Wi-Fi communications manager determines when at least one of a plurality of preselected triggering events occurs and instructs the first portion to enter a probing mode that is used to determine whether the first portion should remain active.

The various features and advantages of this invention will become apparent to those skilled in the art from the following detailed description. The drawings that accompany the detailed description can be briefly described as follows.

BRIEF DESCRIPTION OF THE DRAWINGS

FIG. 4 includes a flowchart diagram summarizing one example feature useful with the embodiment of FIG. 2.

FIG. 5 includes a flowchart diagram summarizing another example feature useful with the embodiment of FIG. 2.

DETAILED DESCRIPTION

The disclosed example arrangement allows for automatically controlling the activation of wireless fidelity (Wi-Fi) communication capability for a mobile station without requiring the Wi-Fi capability of the mobile station to be continuously active at all times. With the disclosed example, it is possible to automatically control the activation of the Wi-Fi capability for a mobile station responsive to at least one of a plurality of preselected triggering events that instigate a Wi-Fi probing mode used for determining whether the Wi-Fi capability should remain active.

Figure 1:
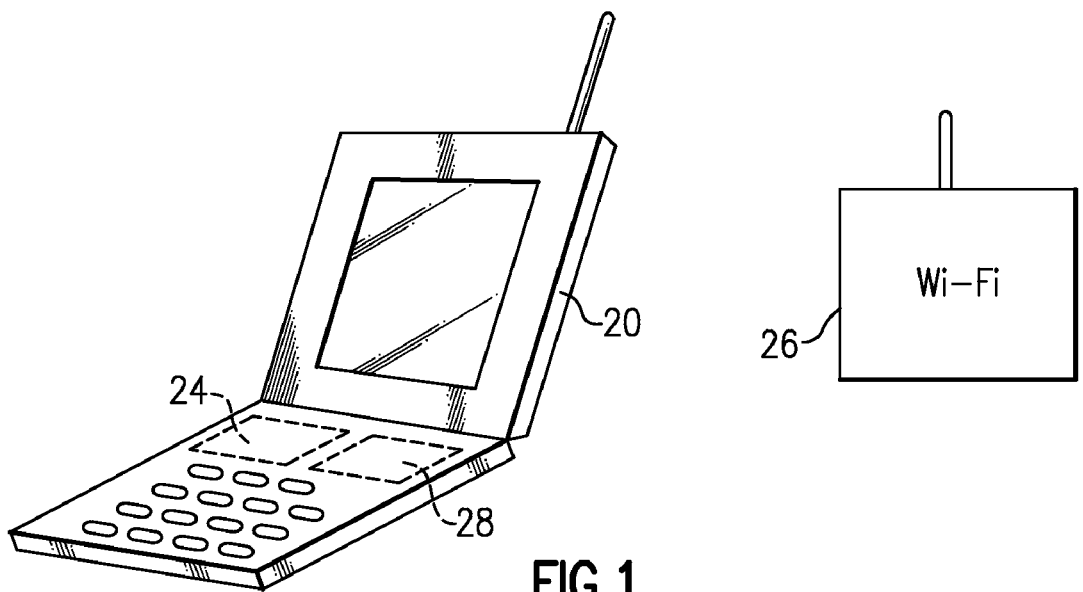
FIG. 1 schematically illustrates selected portions of a communications arrangement including a mobile station that has wireless fidelity communication capability.

FIG. 1 schematically shows an example mobile station 20. While the illustration shows a cellular phone, other mobile stations can be used in an embodiment of this invention. Example mobile stations include personal digital assistants and notebook or laptop computers. This invention is not necessarily limited to any particular type of mobile station.

The example mobile station 20 includes a first portion 24 that provides the mobile station 20 with Wi-Fi communication capability. In one example, the first portion 24 of the mobile station 20 comprises a Wi-Fi network card. In the illustration, the mobile station 20 can communicate with at least one source 26 of Wi-Fi communications. The source 26 may be any known Wi-Fi access point or device.

The example mobile station 20 includes a second portion 28 that comprises a Wi-Fi communications manager (WCM) that controls when the first portion 24 is active. The WCM 28 automatically controls when the first portion 24 is turned on such that the first portion 24 need not be on continuously at all times. Automatically controlling when the first portion 24 is turned on saves battery life for the mobile station 20, for example. The WCM 28 in this example determines when at least one of a plurality of preselected triggering events occurs for purposes of controlling when the first portion 24 is active.

The example mobile station 20 also has communication capability such as cellular phone communications over a wireless network (e.g., UMTS, GSM or CDMA communications). Because the example mobile station 20 is capable of Wi-Fi communications on the one hand and another type of communications on the other hand, the mobile station 20 is considered a dual mode service (DMS) mobile station. The mobile station 20 has the capability of operating in more than one mode for communicating.

Figure 2A:
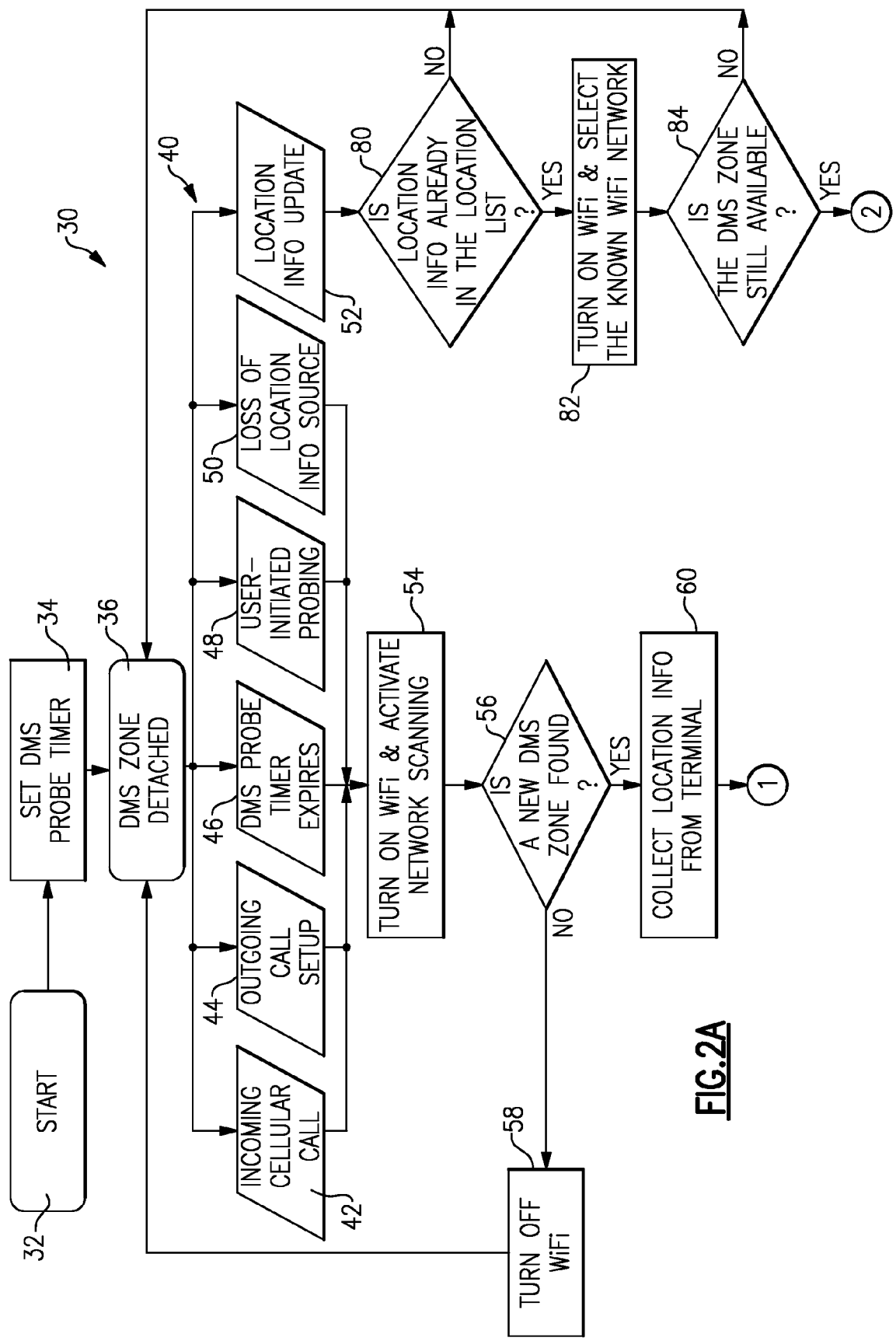
FIGS. 2A and 2B include a flow chart diagram that summarizes one example approach for managing wireless fidelity communication capabilities on a mobile station.
Figure 2B:
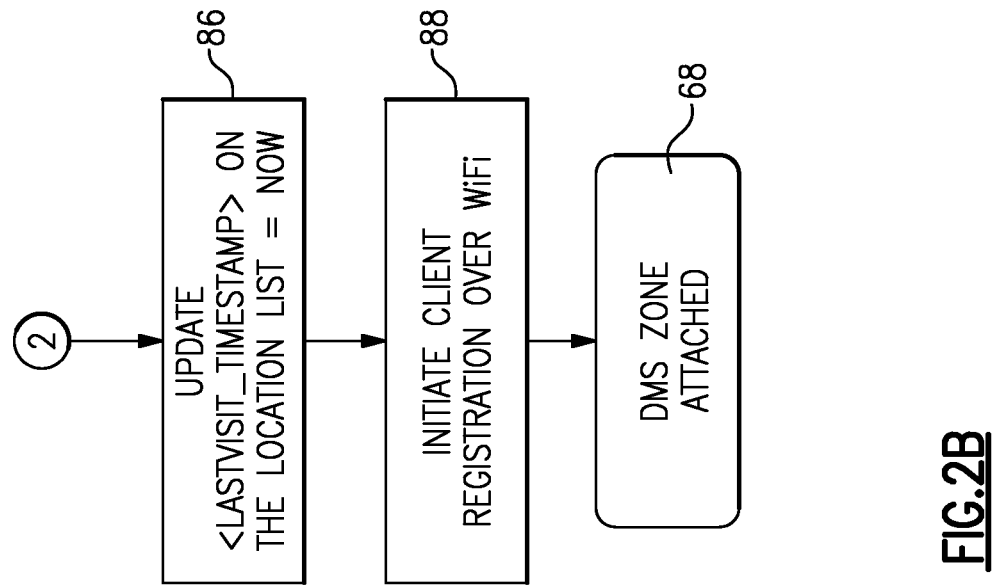
Figure 2B:
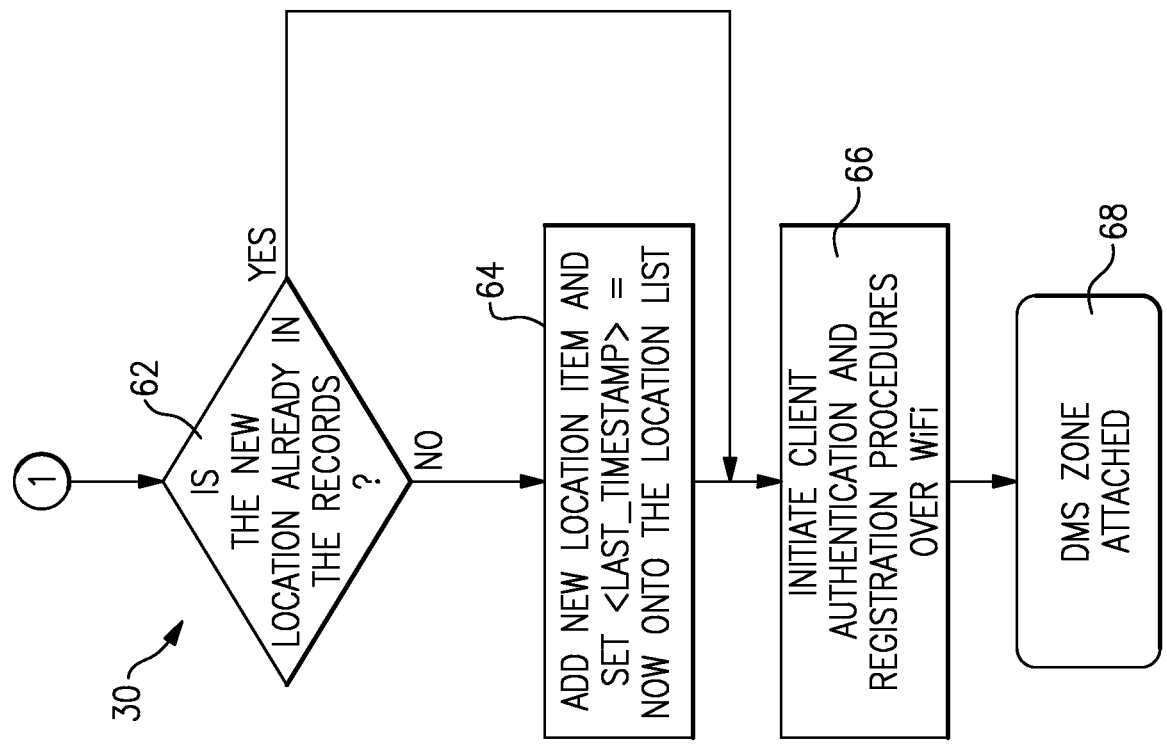

FIGS. 2A and 2B include a flowchart diagram 30 that summarizes one example approach for managing the operation of the first portion 24, which provides Wi-Fi communication capability. The example approach facilitates activating the first portion 24 only when Wi-Fi communications are available, which avoids the need to leave the first portion 24 active at all times. By only selectively activating the first portion 24, the illustrated example allows for saving battery power and reducing processing requirements, for example.

The example process of FIGS. 2A and 2B begins at 32. At 34 a DMS probe timer is set. As shown at 36, the Wi-Fi capabilities of a mobile station are not active. In other words, there is no attachment to a DMS zone, which is an area within which Wi-Fi communications are possible. Whenever the Wi-Fi capabilities are turned off, they remain off until at least one of a plurality of preselected triggering events 40 occurs. In the example of FIG. 2A, the triggering events include an incoming cellular call at 42, an outgoing call setup at 44, the DMS probe timer expiring at 46, a user-initiated probing request at 48, the loss of a location information source at 50 and a location information update at 52. Any one of the example triggering events will be used to initiate a Wi-Fi probing mode in which the mobile station (e.g., the first portion 24) searches for a Wi-Fi access point in the vicinity of the current location of the mobile station.

Using an incoming cellular call or an outgoing call setup (i.e., the triggering events 42 and 44 in the illustrated example) for initiating a Wi-Fi probing mode allows for potential cost savings, for example. In many circumstances, a call can be handled less expensively and delivered in better quality with a higher bit rate over a Wi-Fi connection compared to using a cellular network connection, directly. The example of FIG. 2A recognizes the possibility of establishing a Wi-Fi connection for purposes of handling the call whenever possible. Even though the Wi-Fi capabilities have been inactive, whenever an incoming cellular call or an outgoing call setup begins, the Wi-Fi capabilities of the mobile station are turned on to determine whether the call may be handled using a Wi-Fi connection, for example.

Using a DMS probe timer (i.e., the triggering event 46) allows for periodically checking for Wi-Fi capabilities even if no other triggering event occurs.

The example of FIG. 2A also recognizes that a user of a mobile station may desire to attempt to establish a Wi-Fi connection. Accordingly, the triggering event 48 recognizes when an appropriate selection is made by a user to initiate Wi-Fi activity.

Using the loss of a location information source as a triggering event (i.e., the triggering event 50) addresses a situation where the mobile station may control Wi-Fi capability based on known location information. For example, a user of a mobile station may typically activate Wi-Fi communication capability when they enter their home or office building. Various sources of location information are available to different mobile stations. The triggering event 50 recognizes that if a mobile station loses contact with a source of location information (e.g., loses sight of GPS satellites), it may be beneficial to probe for Wi-Fi access at that time. Additionally, the example triggering event 50 allows for potentially establishing a Wi-Fi connection, which can be used to obtain location information.

Whenever one of the triggering events 42-50 occurs, the Wi-Fi capability of a mobile station is turned on and a Wi-Fi probing mode begins at 54. Activating the Wi-Fi communication capability responsive to one of the triggering events in this manner allows for selectively turning on the Wi-Fi communication capability only when it is potentially useful or needed. At 56, a determination is made whether a Wi-Fi access point is detected in the vicinity of the current location of the mobile station. When Wi-Fi network is detected and through which DMS service is accessible (e.g., successful registration with a VoIP gateway), that is considered a DMS zone. In one example, just recognizing a Wi-Fi network is not considered sufficient to identify a DMS zone. Instead, in such an example, a DMS zone is discovered when the Wi-Fi network is discovered and a connection to some VoIP gateway over that particular Wi-Fi network is possible. In the example of FIG. 2A, if no DMS zone is found, the Wi-Fi capability of the mobile station is turned off at 58 and the process returns to the step at 36.

In the event that a DMS zone is found (e.g., a Wi-Fi access point is available and it is possible to register with a VoIP gateway), information regarding the current mobile station location is collected from the mobile station at 60. As shown in FIG. 2B, the location information is then compared to previously stored Wi-Fi availability locations from a location list, which is stored on the mobile station, for example. If the location of the located DMS zone is not already on the list based upon the determination made at 62, a new location is added to the location list at 64. In the example of FIG. 2B, at the same time, a timestamp is set in association with that location entry to keep track of when the last time the mobile station was in that location. If the DMS zone was already in the location list or once it has been added to the list, a Wi-Fi connection begins at 66 by initiating the appropriate authentication and registration procedures through the Wi-Fi access point. This portion of the process occurs in a known manner. Once the appropriate authentication and registration is completed, the DMS zone is considered attached at 68 and the Wi-Fi communication capabilities of the mobile station remain active.

In one example, the mobile station 20 has a service set identifier (SSID) whitelist of known SSIDs stored in memory. When the SSID of a discovered DMS zone is on the whitelist, that is a known DMS zone. The mobile station 20 may discover a new DMS zone when it detects an unknown SSID by attempting to go through the due authentication and registration procedures. That SSID is added to the known SSID whitelist if the due authentication and registration procedures are performed successfully with a served network. One example includes always attempting to locate a known DMS zone based on the known SSIDs before attempting to identify new or previously unknown SSIDs.

Figure 3:
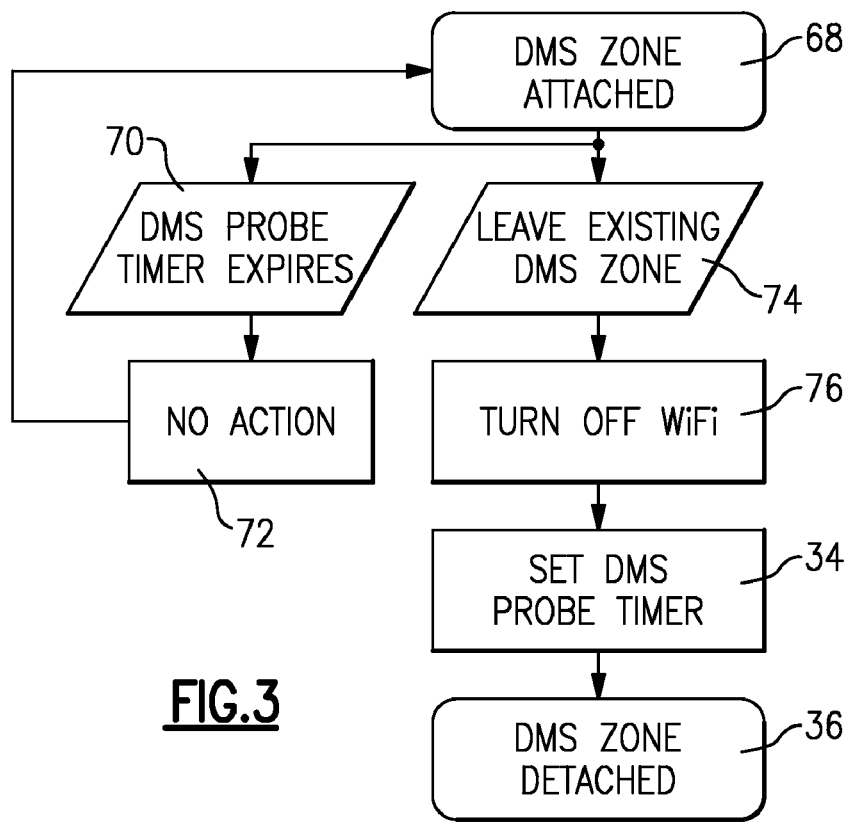
FIG. 3 includes a flowchart diagram that summarizes a technique for using wireless fidelity communications along with the example of FIGS. 2A and 2B.

Referring to FIG. 3, once the Wi-Fi capabilities are active, they remain active until a user disconnects from the Wi-Fi access point manually or leaves the area of coverage of that DMS zone. In the example of FIG. 3, even though the DMS probe timer expires at 70, no action is taken at 72 and the Wi-Fi capabilities of the mobile station remain active. At 74, the mobile station leaves the existing DMS zone. At 76 the Wi-Fi capabilities of the mobile station are automatically turned off. Then, the DMS probe timer is reinitiated at 34 and the process continues to the step 36 as shown in FIG. 2A.

In FIG. 2A, when the triggering event 52 occurs, the WCM 28 detects an update regarding a location of the mobile station. This may be the result of user movement between different locations, for example. A decision is made at 80 whether the current location is found in the location information already in the location list, which indicates where Wi-Fi capability is known to be available. If the current location of the mobile station does not correspond to a location determined to have Wi-Fi capability, the Wi-Fi capability of the mobile station remains inactive. If the current location of the mobile station corresponds to a location where Wi-Fi communications are available, the Wi-Fi capability is turned on at 82 and previously stored information regarding the Wi-Fi network at that location is used to begin the process of establishing a Wi-Fi connection. A decision is made at 84 whether the DMS zone is actually available. This recognizes that in some circumstances a Wi-Fi access point may be reconfigured or moved so that it is no longer available where one had previously been available.

This portion of the example process continues in FIG. 2B where the current time is added at 86 to a record regarding that DMS zone to indicate the most recent time that the mobile station visited that DMS zone. At 88, the client registration begins to establish a Wi-Fi connection. Assuming that is successful, the DMS zone is attached at 68.

A flowchart diagram 100 in FIG. 4 summarizes an example approach for managing the list of DMS zone locations. When an audit timer expires at 102, that is a triggering event to perform the example process of FIG. 4. A location list audit procedure beings at 104. A decision is made at 106 whether an amount of time that has elapsed since the last visit to a DMS zone is greater than a selected threshold. If so, that DMS zone entry on the location list is considered expired and removed from the location list at 108. At 110 a determination is made whether the entire location list has been audited. If not, the next item is considered at 114. If any of the DMS zones in the location list has been visited relatively recently (e.g., not enough time has passed since the last visit to exceed the selected threshold), that item remains on the list as a potential DMS zone within which Wi-Fi communication capability may be accessible. The audit timer is reset at 118 once the audit process is completed.

The example procedure of FIG. 4 allows for maintaining a list of DMS zone locations that does not become unduly large. Mobile stations are portable and carried to a variety of potential DMS zones. The procedure of FIG. 4 recognizes that a user may not care about many such zones or may only need access in one of those zones once or rarely. The auditing process of FIG. 4 allows for minimizing the amount of time the Wi-Fi capability of the mobile station is turned on if the triggering event 52 occurs, for example.

FIG. 5 includes a flowchart diagram 120 that summarizes another example approach for managing a list of DMS zone locations. At 122, the size of the list exceeds a selected threshold size. At 124, at least one of the oldest entries of a DMS zone location is removed from the list. The oldest entry is based upon how recently the DMS zone was visited and accessed using that mobile station. This example approach allows for keeping the DMS zone locations a user is most likely to utilize within the list to increase the chances of establishing a desired Wi-Fi connection in those locations following the procedure for automatically activating Wi-Fi communication capability as described above. At 126 an audit timer is reset to control the timing of the next auditing process.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of managing a mobile station's wireless fidelity (Wi-Fi) communication capability, comprising the steps of:
   turning off the Wi-Fi communication capability when the mobile station is not actively engaged in Wi-Fi communications;
   automatically activating a Wi-Fi probing mode for determining whether the Wi-Fi communication capability of the mobile station should remain active, automatically activating the Wi-Fi probing mode responsive to at least one of a dual mode service probe timer of the mobile station expiring or the mobile station losing contact with a source of location information;
   determining whether a Wi-Fi access point is available in the vicinity of the mobile station during the Wi-Fi probing mode;
   establishing a Wi-Fi communications connection if a Wi-Fi access point is detected;
   establishing a list of locations where the mobile station detects a Wi-Fi access point; and
   associating an indication of a current time with a location on the list when the mobile station detects a Wi-Fi access point at the location;
   determining an amount of time that has elapsed since the most recent time associated with a location in the list; and
   deleting the location from the list if the amount of elapsed time exceeds a threshold.

2. The method of claim 1, comprising
   determining a location of the mobile station when a Wi-Fi access point is detected;
   determining whether the current location is on a list of known dual mode service zones; and
   adding the current location to the list if the current location is not already on the list.

3. The method of claim 1, comprising automatically activating the Wi-Fi probing mode responsive to an initiation of a cellular call involving the mobile station.

4. The method of claim 1, comprising activating the Wi-Fi probing mode responsive to a user-initiated probing mode.

5. The method of claim 1, comprising activating the Wi-Fi probing mode responsive to an update on information regarding a current location of the mobile station.

6. The method of claim 1, comprising
   determining whether a size of a list of locations of known dual mode service zones exceeds a threshold; and
   removing a location from the list that has not been visited by the mobile station as recently as any of the other locations on the list.

7. A mobile station, comprising:
   a first portion having wireless fidelity (Wi-Fi) communication capability, the first portion being turned off when the mobile station is not actively engaged in Wi-Fi communications, the first portion being configured to operate in a probing mode to determine whether a Wi-Fi access point is available in the vicinity of the mobile station during the Wi-Fi probing mode and to establish a Wi-Fi communications connection if a Wi-Fi access point is detected; and
   a Wi-Fi communications manager that activates the first portion in the probing mode for determining whether the Wi-Fi communication capability of the mobile station should remain active, the Wi-Fi communications manager activating the first portion in the probing mode responsive to at least one of a dual mode service probe timer of the mobile station expiring or the mobile station losing contact with a source of location information;

wherein the Wi-Fi communications manager is configured to establish a list of locations where the mobile station detects a Wi-Fi access point;

associate an indication of a current time with a location on the list when the mobile station detects a Wi-Fi access point at the location;

determine an amount of time that has elapsed since the most recent time associated with a location in the list; and delete the location from the list if the amount of elapsed time exceeds a threshold.

8. The mobile station of claim 7, wherein the Wi-Fi communications manager is configured to determine a location of the mobile station when a Wi-Fi access point is detected;

determine whether the current location is on a list of known dual mode service zones; and add the current location to the list if the current location is not already on the list.

9. The mobile station of claim 7, wherein the Wi-Fi communications manager activates the first portion in the probing mode responsive to initiation of a cellular call involving the mobile station.

10. The mobile station of claim 9, wherein the Wi-Fi communications manager activates the first portion in the probing mode responsive to at least one of a user-initiated probing mode; or an update on information regarding a current location of the mobile station.

11. The mobile station of claim 7, wherein the Wi-Fi communications manager is configured to determine whether a size of a list of locations of known dual mode service zones exceeds a threshold; and remove a location from the list that has not been visited by the mobile station as recently as any of the other locations on the list.

12. A method of managing a mobile station's wireless fidelity (Wi-Fi) communication capability, comprising the steps of:

turning off the Wi-Fi communication capability when the mobile stations is not actively engaged in Wi-Fi communications;

automatically activating a Wi-Fi probing mode responsive to at least one of a plurality of preselected triggering events for determining whether the Wi-Fi communication capability of the mobile station should remain active;

establishing a list of locations where the mobile station detects a Wi-Fi access point;

associating an indication of a time with each location on the list when the mobile station most recently detects a Wi-Fi access point at each location;

determining an amount of time that has elapsed since the most recent time associated with each location on the list; and deleting one of the locations from the list if the associated amount of elapsed time exceeds a threshold.

13. A mobile station, comprising:

a first portion having a wireless fidelity (Wi-Fi) communication capability, the first portion being turned off when the mobile station is not actively engaged in Wi-Fi communications;

a Wi-Fi communications manager that activates the first portion in a probing mode responsive to at least one of a plurality of preselected triggering events for determining whether Wi-Fi communication capability of the mobile station should remain active;

the Wi-Fi communications manager being configured to establish a list of locations where the mobile station detects a Wi-Fi access point, associate an indication of a time with each location on the list when the mobile station most recently detected a Wi-Fi access point at each location, determine an amount of time that has elapsed since the most recent time associated with each location on the list and delete one of the locations from the list if the associated amount of elapsed time exceeds a threshold.

* * * * *